US010541935B2

(12) United States Patent
Koren et al.

(10) Patent No.: US 10,541,935 B2
(45) Date of Patent: Jan. 21, 2020

(54) NETWORK PROCESSORS

(71) Applicant: Avago Technologies International Sales Pte. Limited, Singapore (SG)

(72) Inventors: Asaf Koren, Netanya (IL); Eliezer Weitz, Holon (IL); Koby Harel, Hod Hasharon (IL); Ifat Naaman, Hod Hasharon (IL); Hilla Ben Yaacov, Bat Yam (IL); Tal Baum-Mizrachi, Kfar Saba (IL); Yanai Pomeranz, Kfar Saba (IL); Yariv Aviram, Pardes Hana (IL); Ira Joffe, Ramat Yohanan (IL); Oren Issac Wolach, Kfar Saba (IL); Assaf Amitai, Raanana (IL); Daniel Pasternak, Modlin (IL); Yoram Gorsetman, Kadima (IL); Ryan Hirth, Windsor, CA (US); Gal Sitton, Netanya (IL); Mitchell Gordon McGee, Santa Rosa, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 215 days.

(21) Appl. No.: 15/360,107

(22) Filed: Nov. 23, 2016

(65) Prior Publication Data

US 2017/0150242 A1 May 25, 2017

Related U.S. Application Data

(60) Provisional application No. 62/260,129, filed on Nov. 25, 2015.

(51) Int. Cl.

*H04L 12/861* (2013.01)
*H04L 12/863* (2013.01)
*H04Q 11/00* (2006.01)
*H04L 12/883* (2013.01)
*H04L 12/803* (2013.01)

(52) U.S. Cl.

CPC ........ *H04L 47/6255* (2013.01); *H04L 47/125* (2013.01); *H04L 49/9015* (2013.01); *H04L 49/9057* (2013.01); *H04L 49/9078* (2013.01); *H04Q 11/0066* (2013.01); *H04Q 2011/0077* (2013.01)

(58) Field of Classification Search

CPC ............... H04L 47/125; H04L 47/6255; H04L 49/9057; H04L 49/9078; H04L 49/9015; H04Q 11/0066; H04Q 2011/0077

See application file for complete search history.

(56) References Cited

U.S. PATENT DOCUMENTS 7,016,367 B1 * 3/2006 Dyckerhoff ............ H04L 45/00 370/429
8,248,945 B1 * 8/2012 Sathe ..................... H04L 47/13 370/235

(Continued)

*Primary Examiner* — Vinncelas Louis
(74) *Attorney, Agent, or Firm* — Sterne, Kessler, Goldstein & Fox P.L.L.C.

(57) ABSTRACT

The present disclosure is directed to a network processor for processing high volumes of traffic provided by todays access networks at (or near) wireline speeds. The network process can be implemented within a residential gateway to perform, among other functions, routing to deliver high speed data services (e.g., data services with rates up to 10 Gbit/s) from a wide area network (WAN) to end user devices in a local area network (LAN).

16 Claims, 7 Drawing Sheets

(56) References Cited

U.S. PATENT DOCUMENTS

2010/0061380 A1* 3/2010 Barach .............. H04L 29/12339 370/400
2016/0006677 A1* 1/2016 Lamb .................. H04L 49/3045 370/412

* cited by examiner

NETWORK PROCESSORS

CROSS REFERENCE TO RELATED APPLICATIONS

This application claims the benefit of U.S. Provisional Patent Application No. 62/260,129, filed Nov. 25, 2016, which is incorporated by reference herein in its entirety.

TECHNICAL FIELD

This application relates generally to network processors, including network processors for residential gateways.

BACKGROUND

As the demand from users for bandwidth has rapidly increased, optical transmission systems, where subscriber traffic is transmitted using optical networks, have been installed to serve this demand. These networks are typically referred to as fiber-to-the-curb (FTTC), fiber-to-the-building (FTTB), fiber-to-the-premise (FTTP), or fiber-to-the-home (FTTH). Each such network provides access from a central office (CO) to a building, or a home, via, e.g., optical fibers installed near or up to the subscribers' locations.

Examples of optical transmission systems include passive optical networks (PONs), such as Gigabit PON (GPON) and Ethernet PON (EPON), and Active Ethernet, An Active Ethernet is a type of FTTP network that uses optical Ethernet switches to distribute the signal, thus incorporating the customers' premises and the central office into a switched Ethernet network.

An exemplary diagram of a PON 100 is schematically shown in FIG. 1. The PON 100 includes optical network units (ONUs) 120-1 and 120-2 coupled to an optical line terminal (OLT) 130 via optical fibers and one or more passive optical splitters/combiners 140. Traffic data transmission may be achieved by using two optical wavelengths, one for the downstream direction and another for the upstream direction. Downstream transmissions from the OLT 130 are broadcast to all ONUs 120. Each ONU 120 filters its respective data according to, for example, pre-assigned labels. ONUs 120 transmit respective data upstream to OLT 130 during different time slots allocated by OLT 130 for each ONU 120.

The GPON, EPON, and Active Ethernet systems have been adopted by many telecommunication companies in order to deliver high-speed data services (e.g., up to 10 Gbit/s) to their subscribers. These services can include a bundle of TV broadcasting (including high definition and ultra-high definition television channels), Internet access (including streaming video and audio), and telephone services to name a few.

To provide these services, an ONU 120 is typically connected to a residential gateway installed at the premises of a subscriber. As illustrated in FIG. 2, an example residential gateway 200 can be connected to the ONU 120 via a wide area network (WAN) port 202 or can be integrated (not shown) within the residential gateway 200 in other instances. The residential gateway 200 is further connected to end user devices 206-1 through 206-n (e.g., computers, set-top boxes, smart phones, cameras, speakers, etc.) via local area network (LAN) ports 204-1 through 204-n and/or wireless LAN connections (not shown).

In general, the residential gateway 200 functions as a router to connect the ONU 120 to the end user devices 206-1 through 206-n. This allows the end user devices 206-1 through 206-n to access the Internet and other data services via the ONU 120. The residential gateway 200 further provides other functionalities, such as switching, allowing the end user devices 206-1 through 206-n to communicate with each other.

Network units, such as residential gateway 200, are equipped with network processors to provide routing and switching functionalities as well as others by processing packets received via its ports. However, because residential gateways are required to support advanced applications and to process high volumes of traffic provided by todays access networks at (or near) wireline speeds (e.g., to support streaming video, streaming audio, and real-time gaming applications, to name a few), the currently available network processors used by residential gateways have become bottlenecks that limit the performance of local area networks within subscriber premises.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, a block, shown in one of the accompanying drawings illustrating a block diagram shall be understood to include software, firmware, or hardware (such as one or more circuits, special purpose processors, and/or general purpose processors), or any combination thereof. In addition, each block shown in one of the accompanying drawings can include one or more components within an actual device, and each component that forms a part of the described block can function either cooperatively or independently of any other component forming a part of the block. Conversely, multiple blocks described herein can represent a single component within an actual device. Further, components within a block can be in a single device or distributed among multiple devices and can communicate in a wired or wireless manner.

Figure 1:
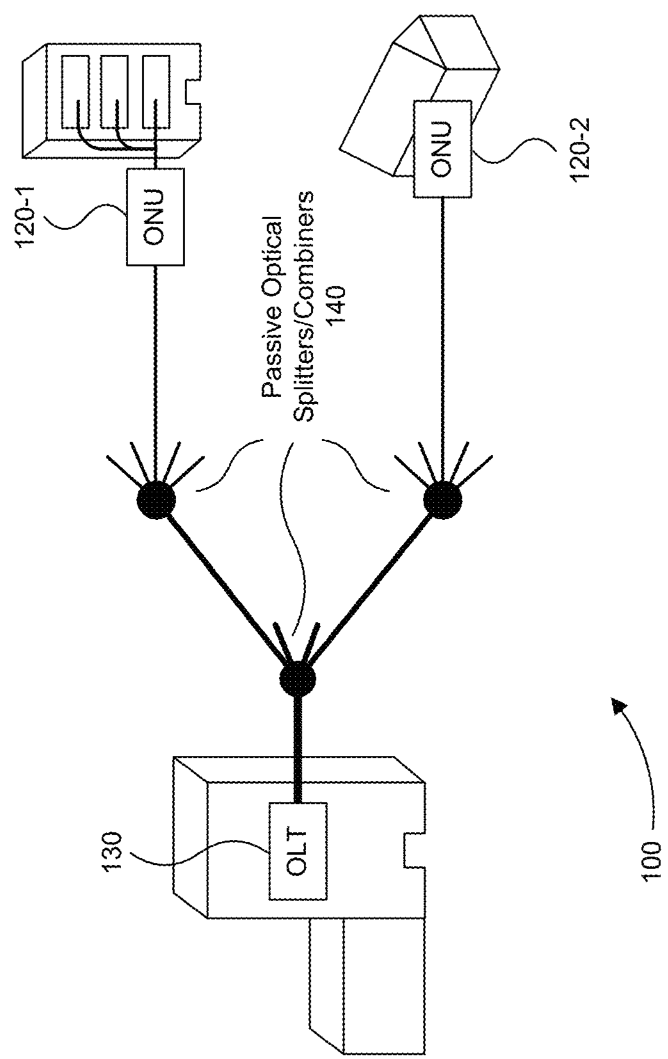
FIG. 1 illustrates an example passive optical network (PON).
Figure 2:
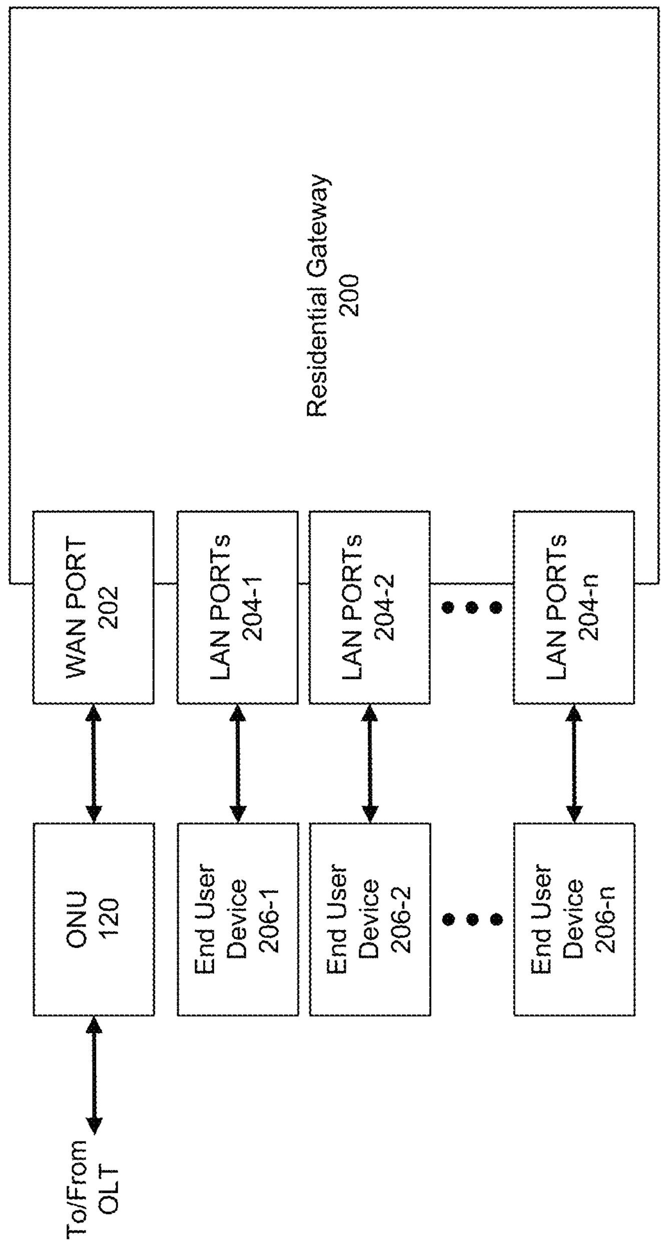
FIG. 2 illustrates an example residential gateway.
Figure 3:
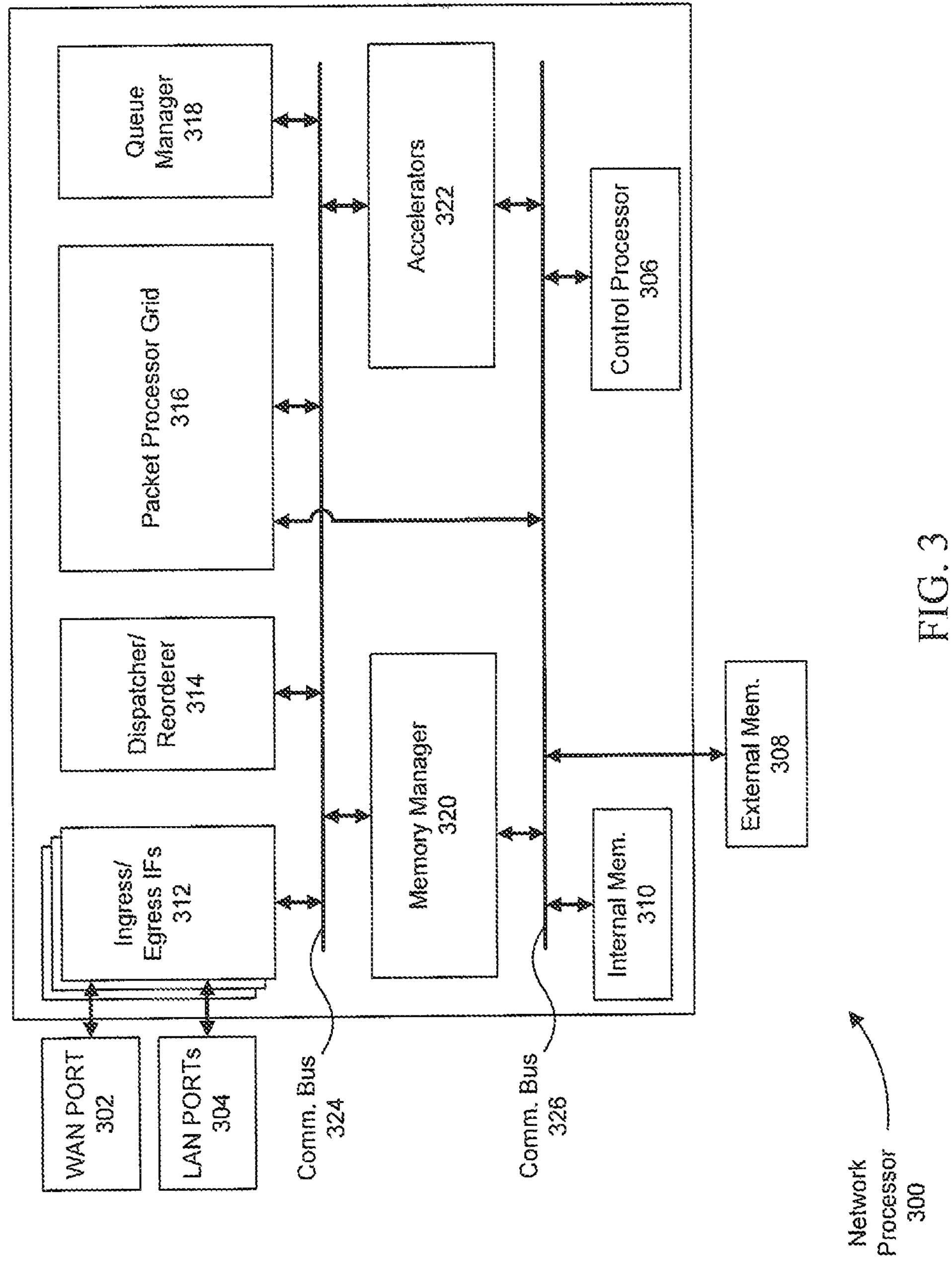
FIG. 3 illustrates an example block diagram of a residential gateway in accordance with embodiments of the present disclosure.

Referring now to FIG. 3, a non-limiting and exemplary block diagram of an architecture of a network processor 300 implemented in accordance with embodiments of the present disclosure is illustrated. The network processor 300 can be implemented in a residential gateway to perform, among other functions, Layer-3 (of the OSI model) routing to deliver high speed data services (e.g., data services with rates up to 10 Gbit/s) from a wide area network (WAN) to end user devices in a local area network (LAN). The network processor 300 can access the WAN via, for example, a fiber modem, a cable modem, and/or a digital subscriber line (DSL) modem either coupled to a WAN port 302 of the residential gateway and/or integrated within the residential gateway. The network processor 300 can access the end user devices via wired connections to LAN ports 304 (e.g., Ethernet ports) or via wireless connections (e.g., wireless connections operated in accordance with an IEEE 802.11 wireless LAN standard) to provide the high-speed data services to the end user devices from the WAN. These high-speed data services can include a bundle of TV broadcasting (including high definition and ultra-high definition television channels), Internet, access (including stream video and audio), and telephone services to name a few.

In addition to Layer-3 routing, the network processor 300 can further be implemented in a residential gateway to perform Layer-2 (of the OSI model) switching between the end user devices of the LAN to support any number of applications, including the growing application of connected or smart homes.

To perform these and other functionalities, the network processor 300 includes a control processor 306, an external memory 308, an internal memory 310, a plurality ingress/egress interfaces (IFs) 312, a dispatcher/reorderer 314, a packet processor grid 316, a queue manager 318, a memory manager 320, and accelerators 322. The external memory 308 is typically larger and slower than the internal memory 310. In an embodiment, the external memory 308 is a double date rate (DDR) random access memory (RAM) and the internal memory 310 is a static RAM (SRAM). The memories 308 and 310 are connected to the components of the network processor 300 via two communication buses; a first communication bus 324 and a second communication bus 326. The memories 308 and 310 are specifically coupled to the first communication bus 324 through the memory manager 320. The memory manager 320 includes a plurality of memory management controllers, such as direct memory access (DMA) controllers.

In operation of network processor 300 to support Layer-3 routing and/or Layer-2 switching, a respective one of ingress/egress IFs 312 receives a packet through WAN port 302 or one of LAN ports 304. The respective ingress/egress IF 312 stores the packet (or at least the packet payload and/or packet header) in the internal memory 310 via the memory manager 320 and writes a packet descriptor for the packet into the dispatcher/reorderer 314. The packet descriptor can include, for example, the packet header or one or more fields from the packet header. In addition, the packet descriptor can include a pointer to the location in the internal memory 310 where the payload and/or header of the packet is stored.

The dispatcher/reorderer 314 is configured to dispatch the packet descriptor to one of a plurality of packet processors in the packet processor grid 316 based on a load balancing scheme. For example, the dispatcher/reorder 314 can dispatch the packet to the least busy, or least utilized, packet processor in the grid 316 based on the load balancing schema. The utilization of a packet processor can be measured by any number of known techniques, including based on how many processes are running on the packet processor and/or are waiting to be run on the packet processor. In one embodiment, each of the packet processors is configured to process multiple packets at any given point in time using multiple threads. Each thread can process a packet until completion.

To maintain packet ordering while implementing such a load balancing scheme, the dispatcher/reorder 314 can add packets to be processed by the packet processors in the grid 316 to a linked list in the order in which the packets are received from the ingress/egress IFs 312. A linked list is a data structure that holds a collection of nodes that form a sequence. Each node in the sequence is composed of data, which in this case is a packet descriptor, and a reference (i.e., a link) to the next node in the sequence. The linked list data structure allows data to be efficiently inserted or removed from any node position in the sequence.

After the dispatcher/reorder 314 forwards a packet descriptor to one of the packet processors in the grid 316 based on the load balancing scheme, the link list node that held the packet descriptor is considered or marked empty until processing of the packet descriptor is done. The dispatcher/reorderer 314 adds the packet descriptor back to its corresponding linked list node after processing is completed by the assigned packet processor in grid 316. Once the head of the linked list is no longer empty, the dispatcher/reorder 314 forwards the packet descriptor at the head of the linked list to the queue manager 318 for further processing.

Figure 4A:
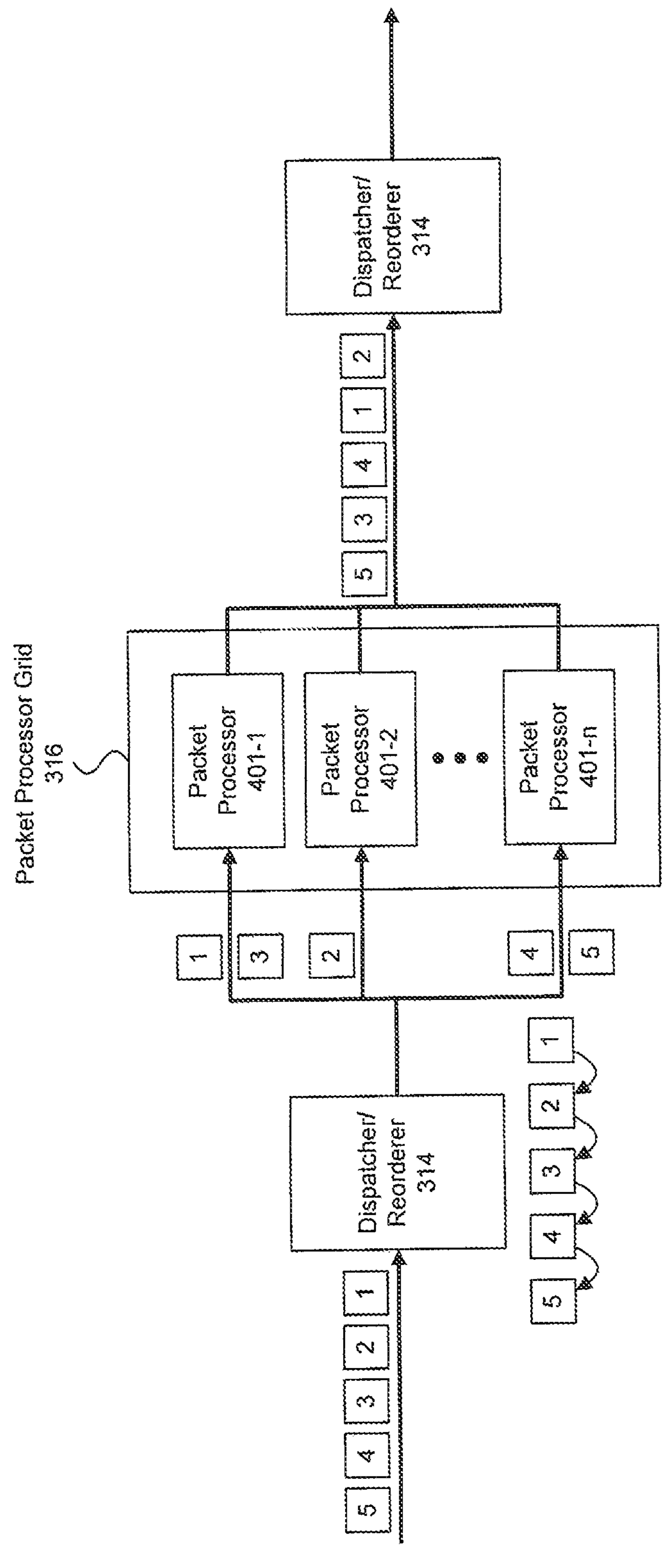
FIG. 4A illustrates an example block diagram of a dispatcher/reorder and packet processor grid performing load balancing and reordering in accordance with embodiments of the present disclosure.

FIG. 4A illustrates an example of this dispatch and reordering operation performed by the dispatcher/reorderer 314. In the example of FIG. 4A, a series of packet descriptors 1 through 5 are received by the dispatcher portion of the dispatcher/reorderer 314 with packet descriptor 1 being received first, packet descriptor 2 being received second, and so on. The dispatcher 314 adds the packet descriptors to a linked list (shown below the dispatcher 314 in FIG. 4A) to maintain the order in which the packet descriptors are received and forwards the packet descriptors to respective ones of the packet processors in the grid 316 based on the load balancing scheme as described above. For example, as shown in FIG. 4A, packet descriptors 1 and 3 are sent to the packet processor 401-1 to be processed to completion by different threads of the packet processor 401-1.

As the packet descriptors are forwarded to the packet processors 401, the link list nodes that held those packet descriptors are considered or marked empty until processing is done. The dispatcher/reorderer 314 adds the packet descriptors back to their corresponding linked list nodes after processing is completed by the assigned packet processors in grid 316. In the example of FIG. 4A, the first packet descriptor added back to its corresponding linked list node is packet descriptor 2. Once the head of the linked list is no longer empty, the reorder 314 forwards the packet descriptor at the head of the linked list to the queue manager 318 for further processing and continues forwarding packet descriptors until the head of the linked list is once again empty.

Figure 4B:
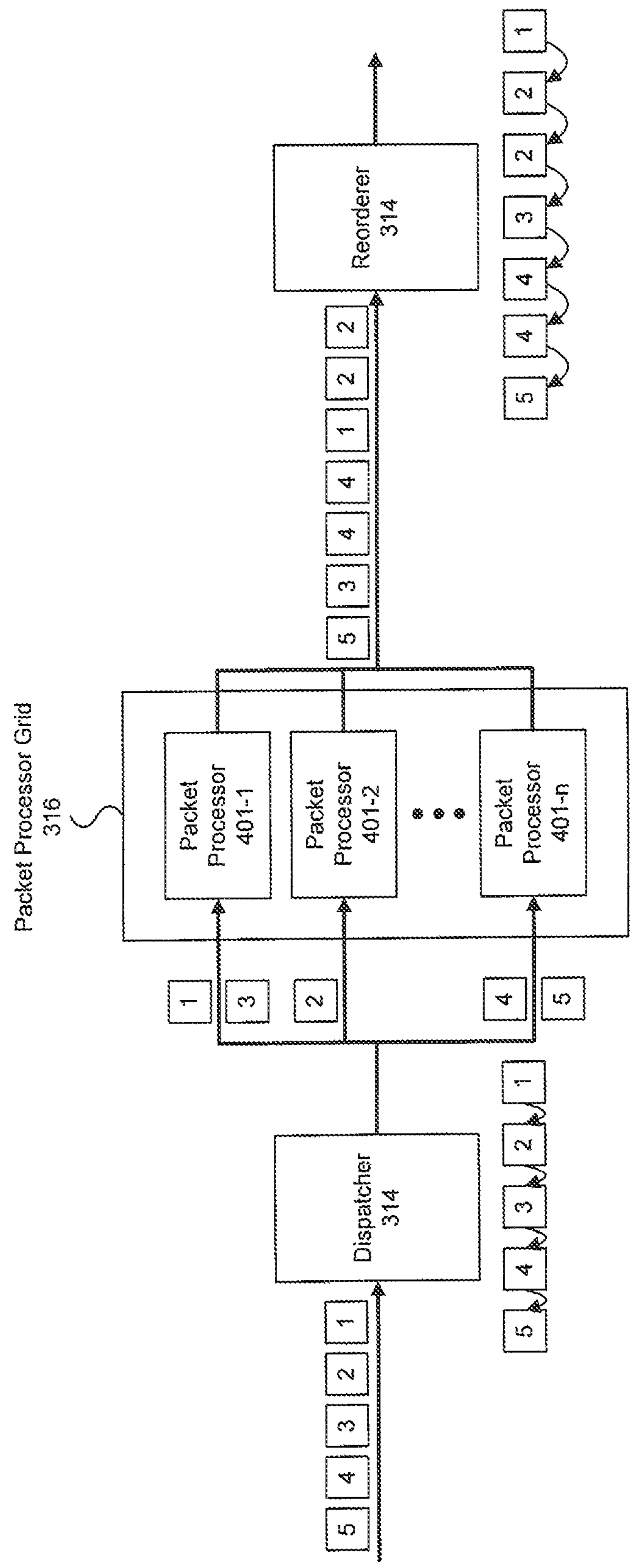
FIG. 4B illustrates an example block diagram of a dispatcher/reorder and packet processor grid performing load balancing and reordering of unicast and multicast packet descriptors in accordance with embodiments of the present disclosure.

FIG. 4B illustrates another example of the dispatch and reordering operation performed by the dispatcher/reorderer 314 except now some of the packets described by the packet descriptors are part of a multicast flow and need to be replicated. In the example of FIG. 4B, a series of packet descriptors 1 through 5 are received by the dispatcher portion of the dispatcher/reorderer 314, with packet descriptor 1 being received first, packet descriptor 2 being received second, and so on. The packets described by packet descriptors 2 and 4 are part of a multicast flow and need to be replicated at least once. The packet processor(s) of the packet processor grid 316 that are assigned to process packet descriptors 2 and 4 are responsible for performing the replication and processing of all multicast packet descriptors associated with these packet descriptors. In addition, the packet processor(s) of the packet processor grid 316 that are assigned to process packet descriptors 2 and 4 are further responsible for indicating to reorderer 314 to allocate free buffers for the multicast packet descriptors and where to connect these buffers to the original linked list in order to accommodate these additional packet descriptors. The increased size linked list is shown below reorderer 314 with packet order preserved. This method of multicast packet duplication advantageously does not require the original packet to be duplicated in internal memory 310.

Figure 5:
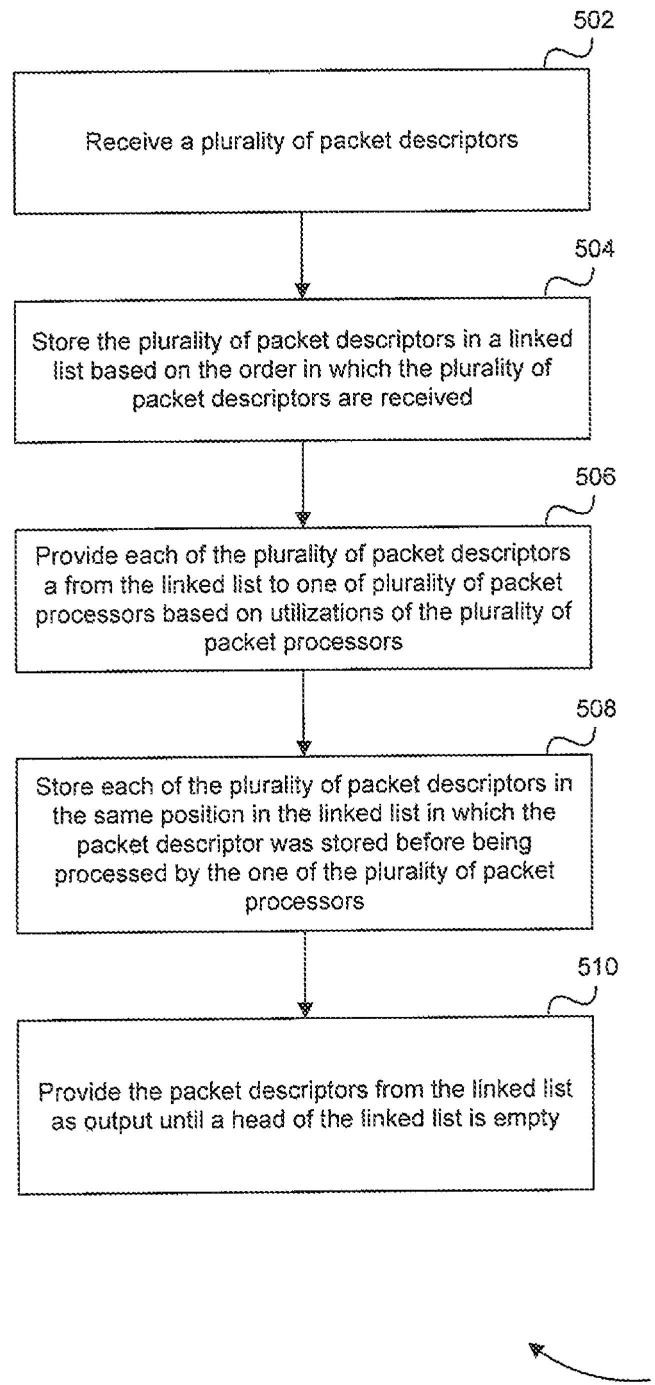
FIG. 5 illustrates a flowchart of a method for performing packet descriptor dispatch and reordering in accordance with embodiments of the present disclosure.

FIG. 5 illustrates a flowchart 500 of a method for packet descriptor dispatch and reordering in accordance with embodiments of the present disclosure. The method of flowchart 500 is described below as being performed by the dispatcher/reorderer 314 described above. However, it should be noted that the method of flowchart 500 is not limited to being performed by tis component nor the network processor 300 in which the dispatcher/reorder 314 is implemented. It should also be noted that some of the steps shown in FIG. 5 can be performed in a different order than shown or concurrently.

The method of flowchart 500 begins at step 502 where a plurality of packet descriptors are received by the dispatcher/reordered 314. After step 502, the method of flowchart 500 proceeds to step 504.

At step 504, the dispatcher/reorderer 314 stores the plurality of packet descriptors in a linked list based on the order in which the plurality of packet descriptors are received by the dispatcher/reorder 314. After step 504, the method of flowchart 500 proceeds to step 506.

At step 506, the dispatcher/reorderer 314 provides each of the plurality of packet descriptors from the linked list to one of the plurality of packet processors in the packet processor grid 316 based on utilizations of the packet processor. For example, the dispatcher/reorderer 314 can provide each of the plurality of packet descriptors to the packet processor with lowest, current utilization among the plurality of packet processors. As explained above, the utilization of a packet processor can be measured by any number of known techniques, including based on how many processes are running on the packet processor and/or are waiting to be run on the packet processor. In one embodiment, each of the packet processors is configured to process multiple packets at any given point in time using multiple threads. Each thread can process a packet until completion. After a packet descriptor is provided to a packet processor for processing, the node in the linked list that stored the packet descriptor can be considered or marked as empty. After step 506, the method of flowchart 500 proceeds to step 508.

At step 508, each of the plurality of packet descriptors are stored in the same position (or in the same node) in the linked list in which the packet descriptor was stored before being processed by the one of the plurality of packet processors. After a processed packet descriptor is placed back into the linked list, the node that stores the processed packet descriptor is no longer considered or marked empty. After step 508, the method of flowchart 500 proceeds to step 510, At step 510, the processed packet descriptors are provided from the linked list as output until a head of the linked list is empty.

Referring back to FIG. 3, the packet processors in the packet processor grid 316 are configured to perform one or more processing operations on the packet descriptors received from the dispatcher/reorder 314 in support of routing, switching, and other functionalities, such as security. For example, the packet processors in the packet processor grid 316 can be configured to perform one or more of parsing the incoming packet descriptors to determine what the associated packet of the packet descriptor is and where the relevant information is for processing; searching (or offloading searching to the accelerators 322) for related information in routing tables, access lists, etc.; classifying the associated packet of the packet descriptor according to one or more forwarding or processing schemes; and modifying the associated packet header of the packet descriptor by adding tags, changing addresses, and/or altering contents.

The switching functions can specifically include, but are not limited to, filtering of packets based on protocol parameters, classification, header modification, forwarding, and quality of service (QoS) mapping, Classification of incoming traffic to flows is performed based on Layer-2 field parameters, such as VLAN tag. Flow parameters together with other packet fields, such as the MAC address or VLAN priority bits are used for setting the header manipulation action as well as making forwarding and QoS decisions.

The routing functions can specifically include packet header parameter validation (such as checksum and packet length) and traffic classification. Traffic can be classified to connections based on Layer-3/Layer-4 fields. Each connection determines routing operations such as network address translation (NAT) parameters, differentiated services code point (DSCP) remarking, next hop IP and PPPoE termination action. Unmatched traffic from the WAN can be processed by firewall logic in the control processor 306.

In support of the functionalities above, the packet processors in the packet processor grid 316 can utilize the accelerators 322. The accelerators 322 are dedicated hardware processing components designed to increase the performance of the packet processors in the packet processor grid 316 by performing time consuming tasks. The accelerators can include, for example, hardware accelerators to perform NAT, security functions, and packet marker counting and metering used for rate limiting. The security functions can include, for example, IP security (IPsec) processing, including encrypting, decrypting, and, authenticating. The encryption/decryption and authentication can include performing algorithms such as AES, 3DES, SHA-1, and MD-5.

Advantageously, the accelerators 322 are not directly coupled to the packet processors in the packet processor grid 316, but arc accessible to the packet processors in the packet processor grid 316 via the communications bus 324. This architecture allows the number of packet processors in the packet processor grid 316 to be more readily scaled. For example, because the packet processors in the packet processor grid 316 are coupled to the accelerators via the communications bus 324, each packet processor in the packet processor grid 316 can have access to any one of the accelerators 322, which enables better resource sharing among any number of packet processors in the packet processor grid 316. Also, such separation makes implementing the packet processors of the packet processor grid 316 in a separate clock domain from the accelerators 322 possible. For example, the communication bus 324 can implement a message passing scheme that allows for communication between devices in separate clock domains of differing, clock frequencies. Thus, when scaling the number of packet processors in the packet processor grid 316 up, closing timing becomes easier because the accelerators 322 can be placed away from the packet processor grid 316 and have a slower clock frequency, for example.

As discussed above, after a packet descriptor is processed by a packet processor in the packet processor grid 316, the packet descriptor is eventually forwarded to the queue manager 318 by dispatcher/reorderer 314. The queue manager 318 is configured to perform shaping and scheduling of the packets associated with the packet descriptors it receives. The queue manager 318 can first perform an initial filter operation on a received packet descriptor and either drop the packet descriptor or continue on with queuing the packet descriptor in an egress queue, selected from a plurality of egress queues, that is associated with the packet descriptor for transmission out WAN port 302 or one of LAN ports 304. For example, in one embodiment, the queue manager 318 can perform an initial filter operation on a received packet descriptor in accordance with a random early detection queuing algorithm or a weighted random early detection queuing algorithm.

After a packet descriptor passes the optional initial filtering operation, the queue manager 318 can next decide on whether to move the packet payload and/or packet header associated with the packet descriptor from the internal memory 310, where it was initially stored, to external memory 308. The internal memory 310 has a smaller read latency than the external memory 308. As a result, maintaining a packet payload and/or header in the internal memory 310 can help improve the speed at which the network processor 300 can process packets. On the other hand, there is a limit to the capacity of the internal memory 310. Thus, some balance needs to be struck, in order to maintain a high-level of performance, between what packet payloads and/or headers remain in the internal memory 310 and what packet payloads and/or headers are moved to the external memory 308.

Figure 6:
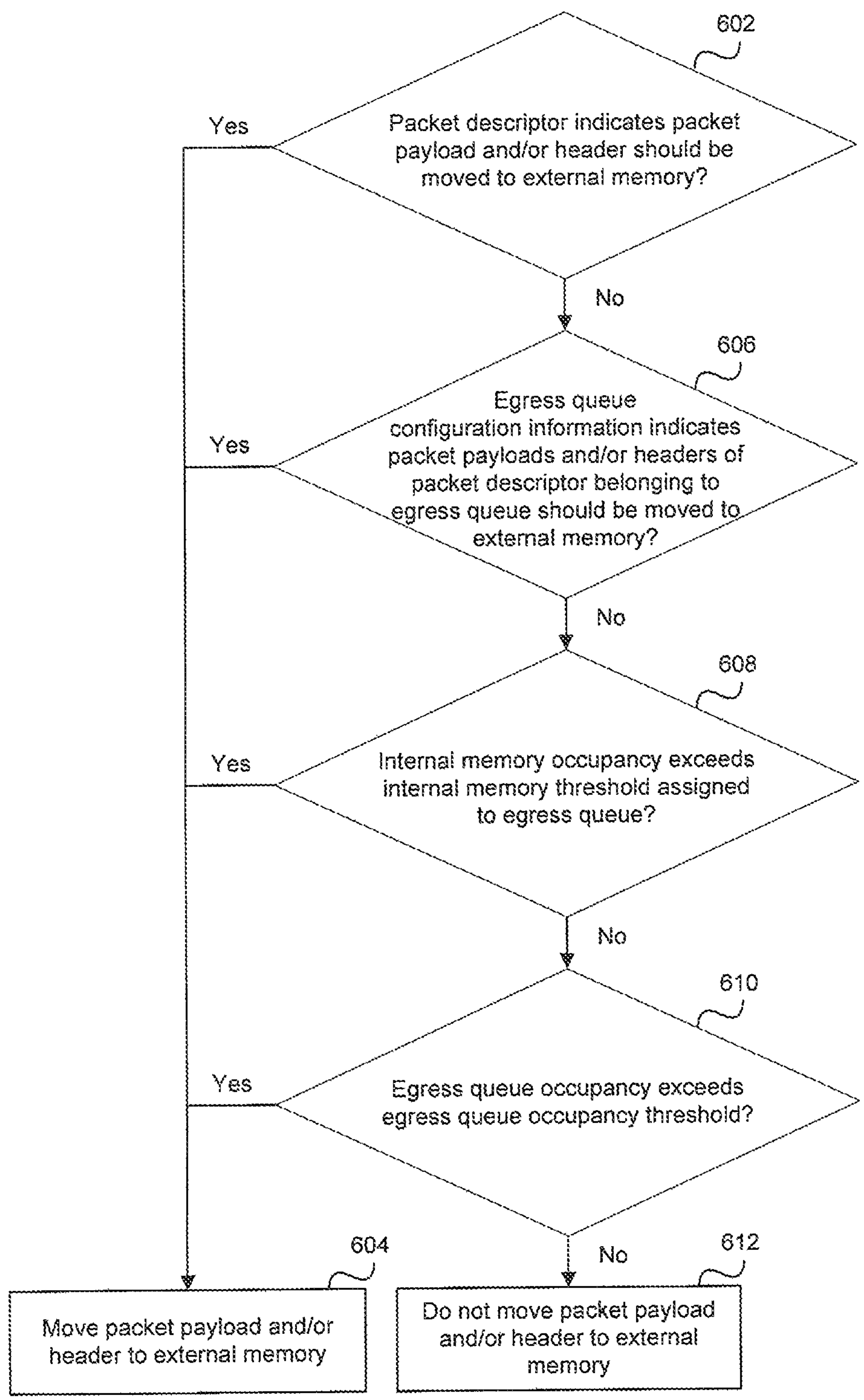
FIG. 6 illustrates a flowchart of a method for performing packet offloading from internal memory to external memory in accordance with embodiments of the present disclosure.

In one embodiment, the queue manager 318 implements an efficient packet offload scheme to highly utilize the internal memory 308, while at the same time preventing the internal memory 308 from becoming congested. FIG. 6 illustrates an example flowchart 600 of this efficient packet offload scheme in accordance with embodiments of the present disclosure. It should be noted that one or more of the steps shown in FIG. 6 can be optionally performed.

At step 602, the queue manager 318 determines whether one of the fields in the packet descriptor indicates that the packet payload and/or header associated with the packet descriptor is to be moved from the internal memory 310 to the external memory 308. If the queue manager 318 determines that a field in the packet descriptor indicates that the packet payload and/or header associated with the packet descriptor is to be moved from the internal memory 310 to the external memory 308, the method of flowchart 600 proceeds to step 604 and the packet payload and/or header is moved from the internal memory 310 to the external memory 308. If the queue manager 318 determines that a field in the packet descriptor does not indicate that the packet payload and/or header associated with the packet descriptor is to be moved from the internal memory 310 to the external memory 308, the method of flowchart 600 proceeds to step 606.

At step 606, the queue manager 318 determines whether configuration information associated with the egress queue in which the packet descriptor is to be stored indicates that packet payloads and/or headers of packet descriptors belonging to the egress queue are to be moved from the internal memory 310 to the external memory 308. If the configuration information associated with the egress queue in which the packet descriptor is to be stored indicates that packet payloads and/or headers of packet descriptors belonging to the egress queue are to be moved from the internal memory 310 to the external memory 308, the method of flowchart 600 proceeds to step 604 and the packet payload and/or header is moved from the internal memory 310 to the external memory 308. If the configuration information associated with the egress queue in which the packet descriptor is to be stored does not indicate that packet payloads and/or headers of packet descriptors belonging to the egress queue are to be moved from the internal memory 310 to the external memory 308, the method of flowchart 600 proceeds to step 608.

At step 608, the queue manager 318 determines whether the occupancy of the internal memory 310 exceeds an internal memory threshold assigned to the egress queue in which the packet descriptor is to be stored. If the queue manager 318 determines that the occupancy of the internal memory 310 exceeds the internal memory threshold assigned to the egress queue in which the packet descriptor is to be stored, the method of flowchart 600 proceeds to step 604 and the packet payload and/or header is moved from the internal memory 310 to the external memory 308. If the queue manager 318 determines that the occupancy of the internal memory 310 does not exceed the internal memory threshold assigned to the egress queue in which the packet descriptor is to be stored, then the method of flowchart 600 proceeds to step 610.

At step 610, the queue manager 318 determines whether the occupancy of the egress queue in which the packet descriptor is to be stored exceeds an egress queue occupancy threshold assigned to the egress queue. If the queue manager 318 determines that the occupancy of the egress queue in which the packet descriptor is to be stored exceeds the egress queue occupancy threshold, the method of flowchart 600 proceeds to step 604 and the packet payload and/or header is moved from the internal memory 310 to the external memory 308. If the queue manager 318 determines that the occupancy of the egress queue in which the packet descriptor is to be stored exceeds the egress queue occupancy threshold, the method of flowchart 600 proceeds to step 612 and the packet payload and/or header is not moved from the internal memory 310 to the external memory 308.

Implementations of the various techniques described herein can be implemented in digital electronic circuitry, or in computer hardware, firmware, software, or in combinations of them. Implementations can implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps can be performed by one or more programmable processors executing a computer program to perform functions by operating on input data and generating output. Method steps also can be performed by, and an apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include at least one processor for executing instructions and one or more memory devices for storing instructions and data. Generally, a computer also can include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the present disclosure.

What is claimed is:

1. A network processor comprising:

a packet processor grid comprising a plurality of packet processors;

a dispatcher configured to provide a plurality of packet descriptors from a linked list to the plurality of packet processors to process the plurality of packet descriptors; and accelerator circuits configured to perform hardware based acceleration of packet processing tasks on behalf of the plurality of packet processors to process the plurality of packet descriptors, wherein the accelerator circuits are implemented in a different clock domain than the plurality of packet processors and are accessed by the plurality of packet processors via a communication bus, wherein a first clock domain of the accelerator circuits is slower than a second clock domain of the plurality of packet processors, and wherein an output of the network processor is based on the plurality of packet descriptors after the plurality of packet descriptors have been processed by the accelerator circuits.

2. The network processor of claim 1, wherein the dispatcher is further configured to provide each of the plurality of packet descriptors to one of the plurality of packet processors based on utilizations of the plurality of packet processors.

3. A network processor comprising:

a packet processor grid comprising a plurality of packet processors;

a dispatcher configured to provide a plurality of packet descriptors from a linked list to the plurality of packet processors to process the plurality of packet descriptors, wherein the dispatcher is further configured to store the plurality of packet descriptors in the linked list based on an order in which the plurality of packet descriptors are received by the dispatcher;

accelerator circuits configured to perform hardware based acceleration of packet processing tasks on behalf of the plurality of packet processors to process the plurality of packet descriptors, wherein the accelerator circuits are implemented in a different clock domain than the plurality of packet processors and are accessed by the plurality of packet processors via a communication bus; and a reorderer configured to receive the plurality of packet descriptors from the plurality of packet processors after the plurality of packet descriptors have been processed and store each of the plurality of packet descriptors in a same position in the linked list in which the packet descriptor was stored by the dispatcher, wherein the reorderer is further configured to provide processed packet descriptors from the linked list as an output until a head of the linked list is empty.

4. A network processor comprising:

a packet processor grid comprising a plurality of packet processors;

a dispatcher configured to provide a plurality of packet descriptors from a linked list to the plurality of packet processors to process the plurality of packet descriptors;

accelerator circuits configured to perform hardware based acceleration of packet processing tasks on behalf of the plurality of packet processors to process the plurality of packet descriptors, wherein the accelerator circuits are implemented in a different clock domain than the plurality of packet processors and are accessed by the plurality of packet processors via a communication bus; and a queue manager configured to queue one of the plurality of packet descriptors, processed by one of the plurality of packet processors, in an egress queue for transmission, wherein the queue manager is further configured to move a packet payload associated with the one of the plurality of packet descriptors from an internal memory of the network processor to an external memory of the network processor based on one or more conditions associated with the network processor.

5. The network processor of claim 4, wherein the one or more conditions include an indication in the one of the plurality of packet descriptors.

6. The network processor of claim 4, wherein the one or more conditions include an indication in configuration information of the egress queue.

7. The network processor of claim 4, wherein the one or more conditions include an occupancy of the internal memory exceeding an internal memory threshold assigned to the egress queue.

8. The network processor of claim 4, wherein the one or more conditions include an occupancy of the egress queue exceeding an egress queue occupancy threshold.

9. A method comprising:

receiving a plurality of packet descriptors;

storing the plurality of packet descriptors in a linked list based on an order in which the plurality of packet descriptors are received;

providing each of the plurality of packet descriptors from the linked list to one of a plurality of packet processors based on utilizations of the plurality of packet processors;

sending, a subset of the plurality of packet descriptors, from one or more of the plurality of packet processors to accelerator circuits to perform hardware based acceleration of packet processing tasks on behalf of the one or more of the plurality of packet processors to process the subset of the plurality of packet descriptors;

storing each of a plurality of processed packet descriptors in a same position in the linked list in which a corresponding packet descriptor was stored before being processed by the one of the plurality of packet processors; and providing the plurality of processed packet descriptors from the linked list as output until a head of the linked list is empty, wherein the accelerator circuits are implemented in a different clock domain than the plurality of packet processors and are accessed by the plurality of packet processors via a communication bus.

10. The method of claim 9, further comprising:

queuing one of the processed packet descriptors provided from the linked list in an egress queue for transmission.

11. The method of claim 10, further comprising:

moving a packet payload associated with the one of the processed packet descriptors from an internal memory of a network processor to an external memory of the network processor based on an indication in the processed packet descriptor.

12. The method of claim 10, further comprising:

moving a packet payload associated with the one of the processed packet descriptors from an internal memory of a network processor to an external memory of the network processor based on an indication in configuration information of the egress queue.

13. The method of claim 10, further comprising:

moving a packet payload associated with the one of the processed packet descriptors from an internal memory of a network processor to an external memory of the network processor based on an occupancy of the internal memory exceeding an internal memory threshold assigned to the egress queue.

14. A network processor comprising:

a packet processor grid comprising a plurality of packet processors;

a dispatcher configured to receive a plurality of packet descriptors, store the plurality of packet descriptors in a linked list based on an order in which the plurality of packet descriptors are received by the dispatcher, and provide each of the plurality of packet descriptors from the linked list to one of the plurality of packet processors based on utilizations of the plurality of packet processors;

accelerator circuits configured to perform hardware based acceleration of packet processing tasks on behalf of the plurality of packet processors to process the plurality of packet descriptors, wherein the accelerator circuits are implemented in a different clock domain than the plurality of packet processors and are accessed by the plurality of packet processors via a communication bus; and a reorderer configured to receive a plurality of processed packet descriptors from the plurality of packet processors, store each of the plurality of processed packet descriptors in a same position in the linked list in which a corresponding packet descriptor was stored by the dispatcher, and provide the plurality of processed packet descriptors from the linked list as output until a head of the linked list is empty.

15. The network processor of claim 14, further comprising:

a queue manager configured to queue one of the plurality of processed packet descriptors, processed by one of the plurality of packet processors, in an egress queue for transmission.

16. The network processor of claim 15, wherein the queue manager is further configured to move a packet payload associated with the one of the plurality of processed packet descriptors from an internal memory of the network processor to an external memory of the network processor based on an occupancy of the internal memory and an occupancy of the egress queue.

* * * * *